United States Patent [19]
Kern

[11] 3,797,241
[45] Mar. 19, 1974

[54] APPARATUS FOR CONTROLLING THE EXHAUST EMISSIONS FROM INTERNAL COMBUSTION ENGINES

[76] Inventor: Herbert Kern, Lerchenstr. 46, 7272 Altensteig, Germany

[22] Filed: Aug. 9, 1971

[21] Appl. No.: 169,937

[30] Foreign Application Priority Data
Dec. 9, 1970   Germany............................ 2060630

[52] U.S. Cl........................ 60/305, 60/307, 60/313, 60/317, 60/323
[51] Int. Cl. ......................... F02b 27/04, F01n 3/10
[58] Field of Search ............. 60/313, 312, 282, 304, 60/323, 317, 305, 307, 303

[56] References Cited
UNITED STATES PATENTS

| | | | |
|---|---|---|---|
| 2,455,493 | 12/1948 | Jacobs .............................. | 60/323 X |
| 2,847,819 | 8/1958 | Muller .................................. | 60/323 |
| 3,491,534 | 1/1970 | Garner...................... | 60/323 X;313 |
| 3,077,071 | 2/1963 | Leichtfuss......................... | 60/323 X |
| 2,263,318 | 11/1941 | Tifft................................... | 60/306 |
| 3,662,541 | 5/1972 | Sawada et al........................ | 60/305 |
| 3,453,824 | 7/1969 | Biesecker............................ | 60/313 |
| 3,091,078 | 5/1963 | Dworak ............................... | 60/304 |
| 3,438,198 | 4/1969 | Bentele ............................... | 60/306 |
| 3,468,124 | 9/1969 | Hraboweckyj....................... | 60/305 |
| 3,488,723 | 1/1970 | Veazie .................................. | 60/282 |
| 3,059,421 | 10/1962 | Schnabel.............................. | 60/303 |
| 3,605,940 | 9/1971 | Christensen ......................... | 60/313 |
| 3,665,712 | 5/1972 | Tenney ................................ | 60/313 |
| 3,486,326 | 12/1969 | Hermes et al....................... | 60/901 |

FOREIGN PATENTS OR APPLICATIONS

| | | | |
|---|---|---|---|
| 319,426 | 9/1929 | Great Britain....................... | 60/313 |
| 805,014 | 11/1936 | France................................. | 60/323 |

OTHER PUBLICATIONS

"The Oil Engine and Gas Turbine," Exhaust Manifolds, Feb. 1952, pp. 400–401.

Primary Examiner—Carlton R. Croyle
Assistant Examiner—Robert E. Garrett

[57] ABSTRACT

An improved apparatus for controlling exhaust emissions and reducing the poisonous components in exhaust gases from multi-cylinder reciprocating and rotary piston internal combustion engines which utilizes the introduction of secondary air into the exhaust gases to further combustion thereof. A pair of exhaust collecting conduits are provided and coupled to a pulse converter which includes an inlet nozzle, a mixing tube and diffuser section. At least a portion of the pulse converter is thermally insulated so as to provide a thermally insulated reaction section wherein the exhaust gases from the engine are further reacted to control the emissions.

16 Claims, 3 Drawing Figures

INVENTOR:
HERBERT KERN

APPARATUS FOR CONTROLLING THE EXHAUST EMISSIONS FROM INTERNAL COMBUSTION ENGINES

BACKGROUND OF THE INVENTION

In order to reduce the concentration of carbon monoxide in the exhaust gases of internal combustion carburetor engines having spark ignition, techniques are known which prevent or limit the formation of carbon monoxide during combustion in the engine, or oxidize the carbon monoxide formed during combustion outside the engine to form carbon dioxide, and thereby render it harmless.

The formation of carbon monoxide during combustion in the engine can only be prevented by operating with a certain amount of excess air. Since a four-stroke engine theoretically reaches its maximum mean pressure at an air ratio of $\eta = 0.9$, the actual value being somewhat lower in view of the more favorable combustion rate, extensive cleaning of the exhaust gases under all load conditions solely by means affecting the formation of the mixture is achieved at the cost of a substantial reduction of the maximum possible performance and by poor acceleration behavior.

When cleaning of the exhaust gases outside the engine is practiced, it is necessary to add a corresponding amount of air to the exhaust gases, irrespective of whether the oxidation of the unburnt hydrocarbons and of the poisonous carbon monoxide to form harmless carbon dioxide is effected by combustion with a flame or by heterogenous catalysis. In known exhaust gas cleaning devices of this kind, the required air, referred to hereinafter as secondary air in distinction to the actual combustion air of the engine, is delivered either by a separate blower driven by the engine, or is drawn into the exhaust conduit through venturis. In the latter case, however, a substantial loss of performance results due to the increase in the static exhaust gas back pressure.

SUMMARY OF THE INVENTION

It is an object of this invention to provide a reliable apparatus for reducing the poisonous components in exhaust gases, which may be economically manufactured, contains no wearing parts, and causes practically no loss of performance in spite of its high efficiency.

Briefly stated, some of the features of the invention include an apparatus of the type hereinbefore mentioned having at least two exhaust gas collecting conduits matched in length and cross-section, and leading into a pulse converter consisting of inlet nozzles, a mixing pipe and diffuser. Each of the exhaust gas collecting conduits is connected to only those cylinders whose outlet valve opening time does not substantially overlap. There is provided for each exhaust gas collecting conduit at least one orifice, located immediately adjacent a cylinder and provided with means for blowing secondary air into the conduits. Further, at least the mixing tube and diffuser zone of the pulse converter are in the form of a thermally insulated reaction section.

The features according to the invention achieve an optimum mixing of the secondary air with the exhaust gases and the provision of the reaction section results in a particularly effective exhaust gas cleaner virtually without increase in the exhaust gas back pressure and without being substantially affected by the prevailing operating conditions. As a result of the combination of the exhaust gas streams near the engine and the reaction already taking place between exhaust gases and secondary air in the collecting conduits, the components reach a very high temperature, particularly in the thermally insulated zones, so that the reaction, additionally accelerated by the mixing process, takes place quickly and transforms the noxious components into harmless substances to the extent required.

In the embodiment where the apparatus is used with a rotary piston engine, preferably, the secondary air inlet is within the zone of the luminous flame penetrating into the outlet during the opening of a valve or outlet slot.

It is a further object of this invention to provide an exhaust gas cleaning apparatus of the kind hereinbefore mentioned, in which the reaction section is substantially rectilinear or at least curved behind the mixing tube.

It is a further object of this invention to provide an exhaust gas cleaning apparatus of the kind hereinbefore mentioned, in which the reaction section comprises the mixing and diffuser tubes and a part of the connected exhaust gas pipe.

It is a further object of this invention to provide an exhaust gas cleaning apparatus of the kind hereinbefore mentioned, in which the elements forming the reaction section form at least one loop. This arrangement results in a very compact construction with the additional advantage of a small heat-radiating surface, which can be embedded in a simple and efficient manner in thermal insulating material. It is also possible to position the tube sections forming the reacting path in the form of at least one loop, so as to surround the exhaust gas collecting conduits, thus producing a particularly compact arrangement with good heat storing properties.

It is a further object of this invention to provide an exhaust gas cleaning apparatus of the kind hereinbefore mentioned, wherein the wall separating the two inlet nozzles leading into the common mixing tube has at least one indentation. The cross-sectional shape of this wall or partition may be wavy, meandering or zig-zag. The indentations in the wall result in particularly good mixing of the secondary air with the exhaust gases thereby furthering the reaction. In addition thereto, the exposed points of the indentations, projecting into the flow of gases, act as "hot spots" which reach high temperatures very quickly and insure quick starting of the exhaust gas cleaning apparatus.

It is a further object of this invention to provide an exhaust gas cleaning apparatus of the kind hereinbefore mentioned, in which the partition wall is disposed in the immediate vicinity of the outlet of a cylinder in such a manner that the gases leaving the cylinder impinge on the partition. This again achieves a very rapid heating of the partition, which forms in this arrangement a type of baffle, while the drawbacks relating to the increase of the exhaust gas back pressure usually encountered in the case of baffles need not be expected, in view of the properties of the pulse converter.

It is a further object of this invention to provide an exhaust gas cleaning apparatus of the kind hereinbefore mentioned, in which the mixing may be further improved and the reaction accelerated by knobs or lugs projecting from the partition, or placement of inclined baffles within the ducting in the zone of the reaction section. These features also permit a reduction in the structural length of the reaction section by virtue of the accelerated reaction effected by the better mixing of exhaust gases and secondary air.

It is a further object of this invention to provide an exhaust gas cleaning apparatus of the kind hereinbefore mentioned, in which the reaction section is thermally insulated by a thermal insulating material in the form of two self-supporting half-shell moldings, or the insulating material may be located in two supporting half-shells which embrace the reaction section.

In principle, the apparatus according to this invention may be used for all multi-cylinder internal combustion engines including reciprocating and rotary piston engines. For example, in an engine with two rotary pistons, corresponding to a conventional six cylinder engine, conditions are particularly favorable for providing an exhaust gas cleaning apparatus according to one aspect of the invention in a particularly compact arrangement.

These and other objects, advantages and features of the invention will become more apparent from the following description taken in conjunction with the accompanying drawings.

DESCRIPTION OF THE PREFERRED EMBODIMENTS

Figure 1:
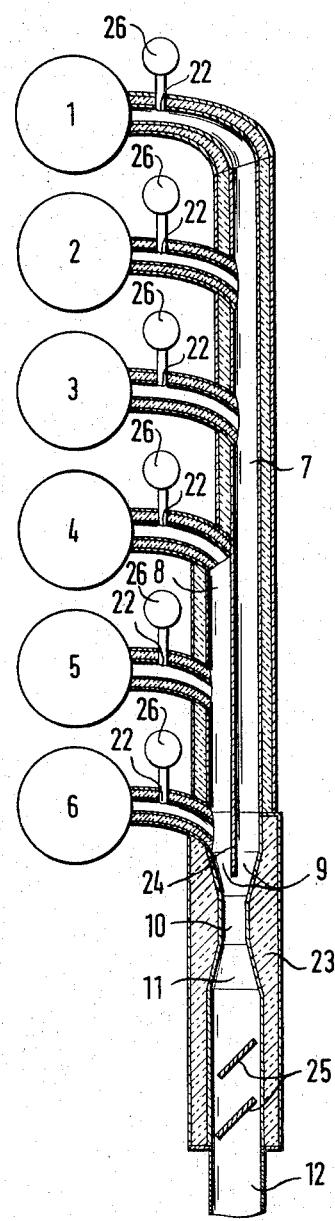
FIG. 1 is a diagrammatic representation of an exhaust gas cleaning apparatus according to this invention adapted for use with a six-cylinder reciprocating piston internal combustion engine.

Referring now to the drawings, operation of the exhaust gas system with pulse converter will first be explained with reference to FIG. 1. The pulse converter consists of at least two ejector-type inlet nozzles 9 leading into a common mixing tube 10 and terminating in a diffuser 11. The velocity of an exhaust gas wave entering an ejector nozzle increases in accordance with the reduction of its cross-section. Simultaneously, a part of the heat content is transformed by expansion to the pressure in the mixing tube, and the outlet velocity of the exhaust gases from the ejector nozzle is further increased. This high velocity corresponds to a low static pressure in the mixing tube, causing exhaust gases to be induced or drawn from the ejector nozzle not in use at the time, and to be mixed with the main jet in the boundary layers. The residual gas velocity remaining after the mixing of the main jet and induction jet must be transformed into a static pressure in the diffuser to enable the exhaust gases to be expelled into the outside air through the downstream ducting. The suction effect of the pulse converter depends mainly on the velocity of the main jet and on the efficiency of the diffuser; these factors may be influenced by suitably dimensioning the main measurements.

The pulse converter is so connected to the exhaust gas collecting conduits 7, 8 of the engine that the two ejector nozzles 9 are affected alternately and in regular sequence by exhaust gas pressure waves, in accordance with the ignition timing. For example, in the six-cylinder engine shown in FIG. 1, those cylinders having an ignition timing of 240° are connected to a common exhaust pipe. With an assumed firing order of 1, 5, 3, 6, 2, 4, cylinders 1, 2, 3 are connected to one collecting conduit 7, and cylinders 4, 5, 6 into the other collecting conduit 8. In this manner, the pressure wave passing from cylinder 1 into the collecting conduit 7 produces through the pulse converter a suction wave in the conduit 8, while the pressure wave passing from cylinder 5 into the collecting conduit 8 produces a suction wave in the conduit 7, which follows the pressure wave in cylinder 1. Since the major part of the phase shift between a pressure wave and the following suction wave depends on the ignition timing, the position of the suction wave is only slightly affected by the rotational speed.

According to the invention, a thermal insulation 23 surrounds that part of the mixing tube, diffuser, and exhaust conduit designated as the reaction section as well as the exhaust gas collecting conduits 7, 8.

Orifices 22, shown diagrammatically in the drawing, are provided in the immediate vicinity of the cylinder outlets for blowing in secondary air. Preferably this secondary air is blown in by a conventional blower, the connections of which are indicated diagrammatically at 26. The secondary air, which is heated on its path to the nozzles 9 in the conduits 7 and 8 and starts to react with the exhaust gases under further heating, is again intensively mixed with the exhaust gases in the mixing tube 10 and in the diffuser 11, and is further heated by the reaction already taking place; during this, the desired transformation of the noxious constituents in the exhaust gases into harmless constitutents occurs and the waste gases leaving the reaction section, constructed as a heat reservoir, contain a very low and acceptable proportion of noxious substances.

It should be noted that the partition 24 is in the immediate vicinity of the cylinder 6 and receives the direct impact of the gases leaving this cylinder, thereby acting as a baffle. Partition 24 is therefore heated very quickly and acts as a hot spot accelerating the reaction. It should be noted that partition 24 may have a curved configuration in cross section or along its longitudinal axis. Further, partition 24 may have formed thereon projecting members, indentations or any other conceivable configuration that would assist in acceleration of reaction of gases.

Adjustable baffles may be provided in the portion of the reaction section surrounded by thermal insulation 23, in order to further intensify the mixing of exhaust gases and secondary air, with the consequence that the reaction is accelerated, allowing for a shorter reaction section to achieve the desired degree of exhaust gas cleaning; this is of particular advantage if the exhaust gas cleaning system is to be used in existing equipment.

Figure 2:
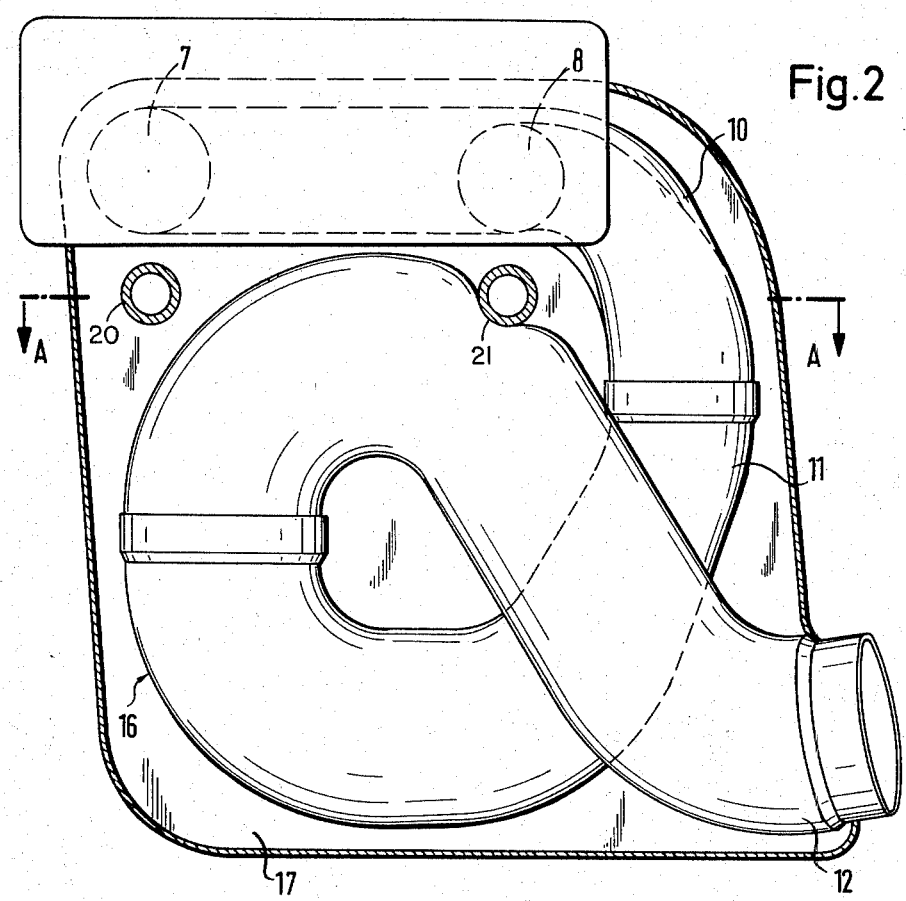
FIG. 2 is a plan view of another embodiment of an exhaust gas cleaning apparatus according to this invention which includes a curved reaction section.

FIG. 2 shows an embodiment of the exhaust gas cleaning apparatus according to the invention, in which the reaction section, formed by the mixing tube 10, the diffuser 11 and a part of the exhaust conduit 12, has a curved configuration. The exhaust collecting conduits 7 and 8 terminate in the form of ejectors in the mixing tube and form inlet nozzles, not shown in the drawing.

To produce a compact space saving construction, the reaction section with the connected exhaust pipe 12 forms a loop arranged adjacent the exhaust gas collecting conduits 7, 8 to achieve quick heating.

The portions of the loop 10, 11, 12 and a part of the exhaust gas collecting conduits 7, 8 are enclosed in a heat insulating material, located in two half-shells, one of which is indicated at 17. Cylindrical mounting sleeves are provided in the half-shells, as at 20, 21 enabling the whole device to be installed, easily, for example, by means of screws or bolts after assembly.

Figure 3:
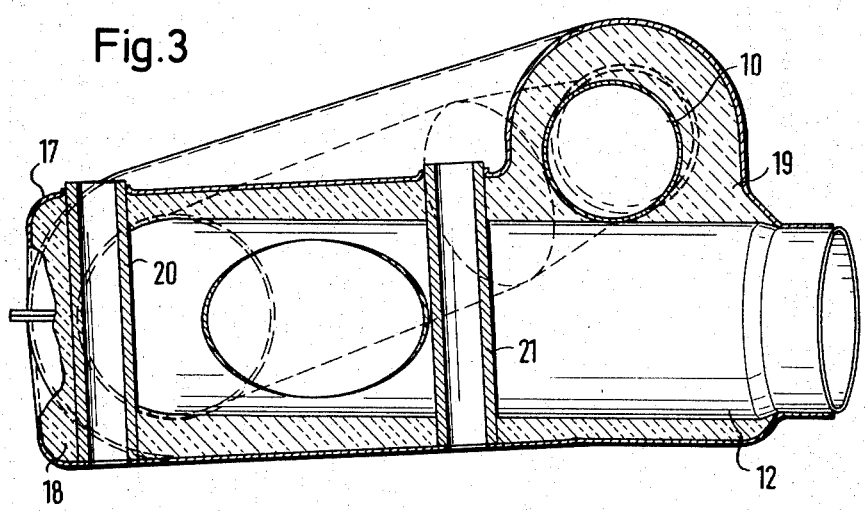
FIG. 3 is a cross-sectional view of the embodiment of FIG. 2 taken along the line A—A in FIG. 2.

The configuration of the two half-shells 17, 18 and their adaptation to the shape of the exhaust gas cleaning device of FIG. 2 is seen in the section shown in FIG. 3. Sufficient space 19 is provided between the conduits carrying the gases and the half-shells 17, 18, wherein a heat insulating material may be placed. If desired, this thermal insulating material may itself carry out the function of the half-shells shown in this embodiment by constructing it as a molding of suitable configuration and of sufficient strength.

The embodiment shown in FIGS. 2 and 3 of an exhaust gas cleaning device is particularly suitable for an engine diagrammatically indicated by reference numeral 30, with two rotary pistons and features a compact construction and high efficiency with practically no loss in performance.

Although the above description is directed to preferred embodiments of the invention, it is noted that other variations and modifications will be apparent to those skilled in the art and, therefore, may be made without departing from the spirit and scope of the present invention.

What is claimed is:

1. An apparatus for controlling the exhaust emissions from an internal combustion engine the combination comprising: a pair of exhaust collecting conduits each being positioned to collect exhaust gasses from the internal combustion engine in a timing sequence such that exhaust gasses enter one of said conduits at a time when exhaust gasses do not enter the other of said conduits; a pulse converter which includes a pair of inlet nozzles having a common wall, a mixing tube and a diffuser, said diffuser being coupled to an exhaust pipe, said inlet nozzles being coupled to said pair of exhaust collecting conduits; positive pressure means for blowing secondary air in the immediate vicinity of each cylinder outlet prior to entry into the exhaust collecting conduits and for initiating the reaction of said exhaust gases; said exhaust pipe including a reaction section at its end immediately adjacent the pulse converter; and means for thermally insulating at least a portion of said exhaust collecting conduits, the entire pulse converter and the entire reaction section, whereby the primary mixing of said secondary air with said exhaust gases takes place within said pulse converter, and the primary reaction of the exhaust gases takes place within said diffuser and said reaction section.

2. An apparatus as set forth in claim 1, wherein said internal combustion engine is a cylinder piston type having cylinders with a predetermined ignition firing order, one half of said cylinders being coupled to one of said pair of exhaust collecting conduits and the remaining half being coupled to the other in a predetermined manner so that exhaust gases are discharged alternately into each of the respective exhaust collecting conduits.

3. An apparatus as set forth in claim 1, wherein said pair of exhaust collecting conduits are substantially balanced in length and cross section.

4. An apparatus as set forth in claim 1, wherein said internal combustion engine is a rotary piston type and wherein said means for introducing secondary air comprises a blower coupled to said exhaust collecting conduits in a manner so that secondary air is introduced into a zone of luminous flame extending beyond a valve during the opening thereof.

5. An apparatus as set forth in claim 1 wherein said reaction section includes in addition to said mixing tube and diffuser, a portion of an exhaust pipe coupled to the diffuser outlet end, which reaction section is substantially rectilinear.

6. An apparatus as set forth in claim 1 wherein said reaction section has a curved configuration along its axis at least after the mixing tube.

7. An apparatus as set forth in claim 6 wherein said reaction section is formed in the shape of a loop with a portion of the reaction section adjacent said exhaust collecting conduits being of a smaller diameter than that of its outlet end.

8. An apparatus as set forth in claim 7 wherein said looped reaction section contains a portion thereof disposed about said exhaust collecting conduits in order to achieve rapid heating thereof.

9. An apparatus as set forth in claim 1 wherein said pair of exhaust collecting conduits include an elongated conduit having a first volume for a portion thereof and a second volume greater than that of said first volume for the remaining portion thereof, a partition wall disposed in said portion having said second volume so as to form a pair of adjacent exhaust collecting conduits, said wall terminating adjacent said inlet nozzles.

10. An apparatus as set forth in claim 9 wherein said partition wall extends at one end thereof into said inlet nozzles, the latter each having progressively decreasing cross-sectional areas in the down-stream direction.

11. An apparatus as set forth in claim 9 wherein said partition wall is disposed adjacent the outlet of at least one cylinder so that the gases issuing from the cylinder impinge on said wall.

12. An apparatus as set forth in claim 1 which further includes a plurality of baffle plates disposed in said reaction section.

13. An apparatus as set forth in claim 1, wherein said means for thermally insulating are in the form of two self-supporting half-shell moldings adapted to be connected to one another.

14. An apparatus as set forth in claim 1 which further includes a supporting shell disposed about at least the sections having said thermal insulating means disposed thereabout, thereby providing mechanical relief for conduit sections subjected to high thermal stresses.

15. An apparatus for controlling the exhaust emissions from a six-cylinder engine having the cylinders arranged in a straight line the combination comprising: a pair of exhaust collecting conduits each being coupled to one half of the cylinders of the engine in a predetermined manner so that the exhaust gases are discharged alternately into each of the respective exhaust collecting conduits, said pair of exhaust collecting conduits including a substantially straight elongated tubular conduit having a first diameter for a portion thereof and a second diameter greater than that of said first diameter for the remaining portion thereof, a partition wall disposed in said portion having said second diameter so as to form a pair of adjacent exhaust collecting conduits; a pulse converter section which includes a pair of inlet nozzles, a mixing tube and diffuser, said inlet nozzles ends thereof being coupled to said pair of exhaust collecting conduits at the end having said second diameter; positive pressure means for introducing secondary air in the immediate vicinity of each cylinder outlet; and means for thermally insulating at least a portion of said exhaust collecting conduits, said pulse converter and at least a portion of said exhaust pipe so as to form a thermally insulated reaction section wherein the exhaust gases from the engine are reacted in order to control the exhaust emissions therefrom.

16. An apparatus for controlling the exhaust emissions from a rotary piston engine the combination comprising: a pair of tubular exhaust collecting conduits each being coupled to the engine in a predetermined manner so that the exhaust gases are discharged alternately into each of the respective exhaust collecting conduits; a reaction section including a mixing tube and diffuser portion, said mixing tube being in communication with each of said pair of exhaust collecting conduits, said reaction section being further characterized in that it is in a looped configuration with the portion thereof coupled to said exhaust collecting conduits being of a smaller diameter than that of the outlet end thereof; positive pressure means for introducing secondary air in the immediate vicinity of each rotary piston exhaust outlet; and means for thermally insulating said reaction section so as to form a thermally insulated reaction section wherein the exhaust gases from the engine are reacted in order to control the exhaust emissions therefrom.

* * * * *